(12) United States Patent
Okuno

(10) Patent No.: US 8,909,362 B2
(45) Date of Patent: Dec. 9, 2014

(54) SIGNAL PROCESSING APPARATUS AND SIGNAL PROCESSING METHOD

(75) Inventor: Hidehiko Okuno, Tokyo (JP)

(73) Assignee: Sony Corporation, Tokyo (JP)

( * ) Notice: Subject to any disclaimer, the term of this patent is extended or adjusted under 35 U.S.C. 154(b) by 529 days.

(21) Appl. No.: 13/225,665

(22) Filed: Sep. 6, 2011

(65) Prior Publication Data

US 2012/0065751 A1 Mar. 15, 2012

(30) Foreign Application Priority Data

Sep. 13, 2010 (JP) ................. 2010-204527

(51) Int. Cl.
| | | |
|---|---|---|
| G06F 17/00 | (2006.01) |
| G06F 15/16 | (2006.01) |
| H04B 3/00 | (2006.01) |
| H04N 21/41 | (2011.01) |
| G11B 27/32 | (2006.01) |
| G11B 27/10 | (2006.01) |
| H04L 29/06 | (2006.01) |
| G11B 27/11 | (2006.01) |
| H04N 5/775 | (2006.01) |
| G11B 27/34 | (2006.01) |
| H04N 21/436 | (2011.01) |
| H04N 21/432 | (2011.01) |
| G11B 20/10 | (2006.01) |
| G06F 17/30 | (2006.01) |

(52) U.S. Cl.
CPC ........ *H04L 65/4092* (2013.01); *H04N 21/4126* (2013.01); *G11B 27/329* (2013.01); *G11B 2020/10546* (2013.01); *G11B 20/10527* (2013.01); *G11B 27/105* (2013.01); *G11B 27/10* (2013.01); *G06F 17/30752* (2013.01); *G11B 27/11* (2013.01); *H04N 5/775* (2013.01); *G11B 27/34* (2013.01); *H04N 21/43622* (2013.01); *H04N 21/4325* (2013.01); *H04L 65/60* (2013.01); *G11B 2020/10537* (2013.01)
USPC ............................... 700/94; 381/77; 709/231

(58) Field of Classification Search
USPC ................... 381/77, 79; 700/94; 710/15–19; 709/231
See application file for complete search history.

(56) References Cited

U.S. PATENT DOCUMENTS

| | | | | |
|---|---|---|---|---|
| 7,702,279 B2 * | 4/2010 | Ko et al. | ...................... 455/3.06 |
| 2002/0002039 A1 * | 1/2002 | Qureshey et al. | ............. 455/344 |

(Continued)

FOREIGN PATENT DOCUMENTS

| | | |
|---|---|---|
| JP | 2004-129133 | 4/2004 |
| JP | 2007-066473 | 3/2007 |

(Continued)

OTHER PUBLICATIONS

U.S. Appl. No. 13/225,978, filed Sep. 6, 2011, Okuno.

(Continued)

*Primary Examiner* — Jesse Elbin
(74) *Attorney, Agent, or Firm* — Oblon, Spivak, McClelland, Maier & Neustadt, L.L.P.

(57) ABSTRACT

A signal processing apparatus includes a connection section for being attachable to or detachable from an external device which reproduces content and attribute information of the content and a control section for controlling the external device which is mounted on the connection section. The control section acquires the attribute information from an external device, supplies a reproduction request for content to the external device, supplies content reproduced by the external device in response to the reproduction request to a reproduction device by streaming, and determines whether or not the content is completely reproduced using the acquired attribute information, and when it is determined that the reproduction of the content is completed, controlling the external device by stopping the reproduction of the content and notifying that the reproduction of the content is completed to the reproduction device.

20 Claims, 11 Drawing Sheets

(56) References Cited

U.S. PATENT DOCUMENTS

| | | | |
|---|---|---|---|
| 2006/0109495 A1 | 5/2006 | Fukutarou et al. | |
| 2007/0038999 A1* | 2/2007 | Millington | 718/100 |
| 2007/0142024 A1* | 6/2007 | Clayton et al. | 455/403 |
| 2008/0008331 A1* | 1/2008 | Tomono et al. | 381/80 |
| 2008/0162716 A1* | 7/2008 | Kayanuma et al. | 709/231 |

FOREIGN PATENT DOCUMENTS

| | | |
|---|---|---|
| JP | 2008-040893 | 2/2008 |
| JP | 2009-086157 | 4/2009 |
| JP | 2009-096267 | 5/2009 |
| JP | 2009-124483 | 6/2009 |
| JP | 2009-258916 | 11/2009 |

OTHER PUBLICATIONS

Office Action issued May 7, 2014 in Japanese Application No. 2010-204527 (3 pages).

* cited by examiner

SIGNAL PROCESSING APPARATUS AND SIGNAL PROCESSING METHOD

BACKGROUND

The present disclosure relates to a signal processing apparatus and a signal processing method.

Portable reproduction devices in which content such as movies or music is stored are able to be carried, so that the content may be easily watched and listened to outdoors. Such a portable reproduction device may be improved in functionality by being combined with other devices rather than separately. For example, the portable reproduction device may be mounted on the reproduction device which is provided in the home or a car, and the content stored in the portable reproduction device can be watched or listened to with high audio quality or high definition using a speaker of the reproduction device or a display.

In this way, when the portable reproduction device and other reproduction devices are used, it is necessary to synchronize processes which are performed in the respective devices such as starting or stopping of reproduction of the content. For example, Japanese Unexamined Patent Application Publication No. 2004-129133 discloses that a common point of time is assigned to respective process systems to synchronize the respective process systems.

SUMMARY

However, since there are various proposals for the above-mentioned portable reproduction device from many manufacturers, the possible control of the portable reproduction device may be limited according to specifications of the portable reproduction devices. For example, when a user designates any content and instructs a reproduction action, another content item may be reproduced after the designated content is reproduced according to the specifications of the portable reproduction devices. For this reason, after the desired content of the user is completely reproduced, another content item is also reproduced, so that there is a problem in that the user may be given a sense of discomfort.

Furthermore, there is a problem in that, for example, when a title of the content is displayed in the reproduction device during reproduction, the reproduction device does not recognize that another content item has been reproduced, so that the title is different from the actual content being reproduced. In the synchronization technique described in Japanese Unexamined Patent Application Publication No. 2004-129133, the specification of the portable reproduction device is necessarily changed to a specification which is able to recognize the common point of time, such that the technique may be not possible to be applied in the case where the specification of the portable reproduction device is not able to be changed.

Therefore, it is desirable to provide a signal processing apparatus and a signal processing method of synchronizing the respective devices without changing the specifications of the portable reproduction devices.

According to an embodiment of the present disclosure, there is provided a signal processing apparatus including a connection section for being attachable to or detachable from an external device which reproduces a plurality of content items and attribute information of each of the plurality of content items; and a control section for controlling the external device which is mounted on the connection section, wherein the control section performs acquiring the attribute information from an external device which is mounted on the connection section, supplying a reproduction request for content to the external device which is mounted on the connection section, supplying content which is reproduced by the external device in response to the reproduction request to a reproduction device by streaming, and determining whether or not the content is completely reproduced using the acquired attribute information, and when it is determined that the reproduction of the content is completed, controlling the external device by stopping the reproduction of the content and notifying that the reproduction of the content is completed to the reproduction device.

According to another embodiment of the present disclosure, these is provided a signal processing method including connecting a connection section which is attachable to or detachable from an external device which reproduces a plurality of content items and attribute information of each of the plurality of content items; and controlling the external device which is mounted on the connection section, wherein controlling of the external device includes acquiring the attribute information from an external device which is mounted on the connection section, supplying a reproduction request for content to the external device which is mounted on the connection section, supplying content which is reproduced by the external device in response to the reproduction request to a reproduction device by streaming, and determining whether or not the content is completely reproduced using the acquired attribute information, and when it is determined that the reproduction of the content is completed, controlling the external device by stopping the reproduction of the content and notifying that the reproduction of the content is completed to the reproduction device.

According to at least one of the embodiments, without changing the specifications of portable reproduction devices, it is possible to synchronize the processes which are performed by the respective devices.

DETAILED DESCRIPTION OF EMBODIMENTS

Hereinafter, a plurality of embodiments and modified examples will be described with reference to the drawings. The description will be done along with the following order.

First Embodiment
Second Embodiment
Modified Example

Further, the embodiments to be described below are exemplary specific examples and technically limited in various exemplary aspects, but in the following description, these embodiments are not limited thereto unless the context clearly dictates otherwise.

First Embodiment 1-1. System Configuration

Figure 1:
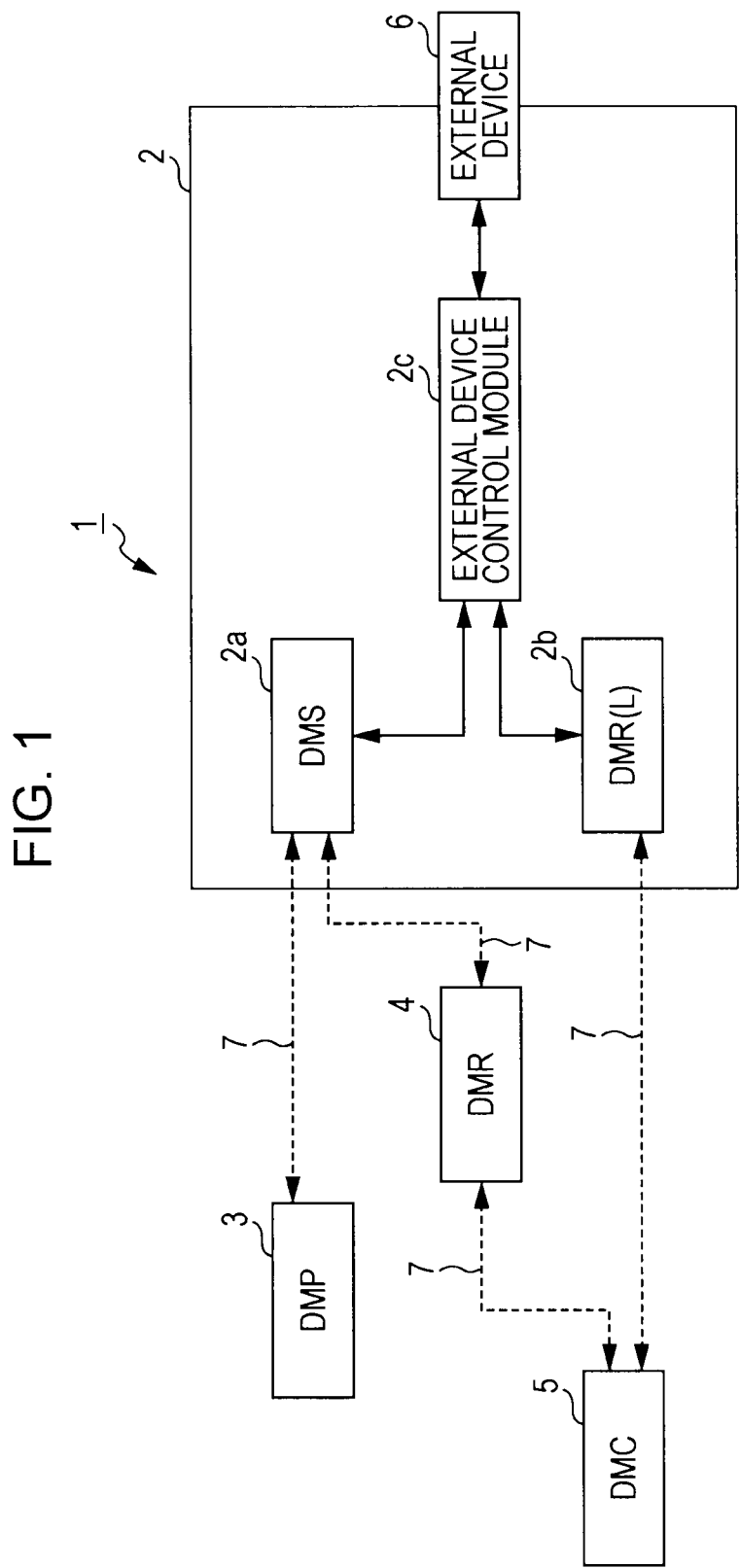
FIG. 1 is a block diagram illustrating an example of a system configuration.

FIG. 1 shows an example of the configuration of a system 1 according to the first embodiment. In the first embodiment, devices 2 and 3 and devices 4 and 5 are connected to each other via, for example, a LAN (Local Area Network) 7 at home. Each of the devices has a DLNA (Digital Living Network Alliance) function.

DLNA is a specification for establishing a home network to which a plurality of electronic devices on a network is connected. With the DLNA, digital AV (Audio Visual) devices or personal computers are connected to each other by the home network, and video, music, still images and the like are designated as specifications (guidelines) through which content is used therebetween.

Content means subject matter that is generally used in an AV device such music, movies, and pictures. In the embodiments as to be described below, the content will be described as musical content. In the specification of the DLNA, the device is defined as to be described below.

DMS (Digital Media Server): a content providing section for providing content. It is called a server. Specifically, a hard disk, a video recorder, a personal computer, a recorder integrated type video camera (a so-called camcorder), a digital camera and the like are exemplified. An interface function between the DMS and devices which are connected to the DMS may be included.

DMP (Digital Media Player): a control reproduction section which has the interface function and a content reproduction function. Specifically, a TV receiver, an audio system, and a TV receiver having a speaker are exemplified.

DMR (Digital Media Renderer): a reproduction section which has a function of reproduction content maintained in the DMS or content transmitted from the DMS under the control of a DMC to be described later. It is called a renderer. Specifically, the video monitor, and a speaker and the like are exemplified.

DMC (Digital Media Controller): a control function section for performing a necessary control of reproduction by controlling the DMR. Specifically, a remote controller, a portable telephone, a pocket personal computer and the like are exemplified.

In the home network which is established by a structure with reference to DLNA, AV content stored in a server may be designated by a player to be reproduced via a network. Alternatively, the AV content which is designated by a controller may be reproduced by a renderer.

As shown in FIG. 1, a device 2 which is an example of the signal processing apparatus serves as the DMS and the DMR. The device 2 corresponds to a CDS (Content Directory System). The DMS 2a of the device 2 stores the musical content and the like, and serves as a network connection section. The musical content, test data, or the like is transmitted to a device which is connected from the DMS 2a of the device 2 via LAN 7. In addition, the device 2 includes a DMR (L (Local Renderer)) 2b which is configured with, for example, an amplifier and a speaker. Musical content which is stored in the DMS 2a, musical content which is supplied from an external device 6 to be described later and the like are reproduced from the DMR(L) 2b.

In the device 2, a connection section (not shown) is provided. The external device 6 is attached or detached with respect to the connection section. The device 2 is provided with an external device control module 2c which is an example of a control section. The external device control module 2c is, for example, a CPU (Central Processing Unit) and controls the external device 6 which is mounted on the device 2. The external device control module 2c performs, for example, a control of supplying the external device 6 with a reproduction request for the musical content, a control of supplying another device with the musical content which are reproduced by the external device 6, or a control of stopping a reproduction process which is performed by the external device 6, and the details thereof will be described later.

The external device 6 is, for example, a portable music player. The external device 6 is provided with a memory (not shown) which stores a plurality of musical content items. For example, in the memory, many pieces of album data are stored, and in each of many pieces of album data, the musical content per piece of music which belongs to each album is stored in the order of the tracks. The external device 6 has a function of reproducing the musical content which is stored in the memory. In the memory of the external device 6, the musical content list or titles of the respective musical content which are stored in the external device 6, reproduction time information which is reproduction time of the musical content, and attribute information such as a picture of a jacket-sleeve (which is also referred to as meta information or music information) are stored.

In addition, in FIG. 1, a device 3 which is an example of a reproduction device serves as the DMP. The DMP 3 is, for example, a TV receiver which is provided with a speaker and a display. The DMP 3 has a function of reproducing, for example, text data or the musical content which is transmitted from the device 2, as well as television broadcasting, a function of reproducing text data or the musical content which is transmitted from the device 2, and a function of transmitting a reproduction request for the musical content to the device 2. An operation input section (not shown) for performing these functions is provided in the DMP 3.

A device 4 which is an example of the reproduction device serves as the DMR. The DMR 4 is, for example, an audio system which is provided with an amplifier and a speaker. A device 5 which is an example of another device serves as the DMC. The DMC 5 is, for example, a remote controller which is provided with a display. The respective devices are connected via a LAN 7 which is an example of a network, and between the respective devices, data such as the musical content or the text data, a command such as a reproduction request is transmitted via the LAN 7.

1-2. External Appearance of Device 2

Figure 2:
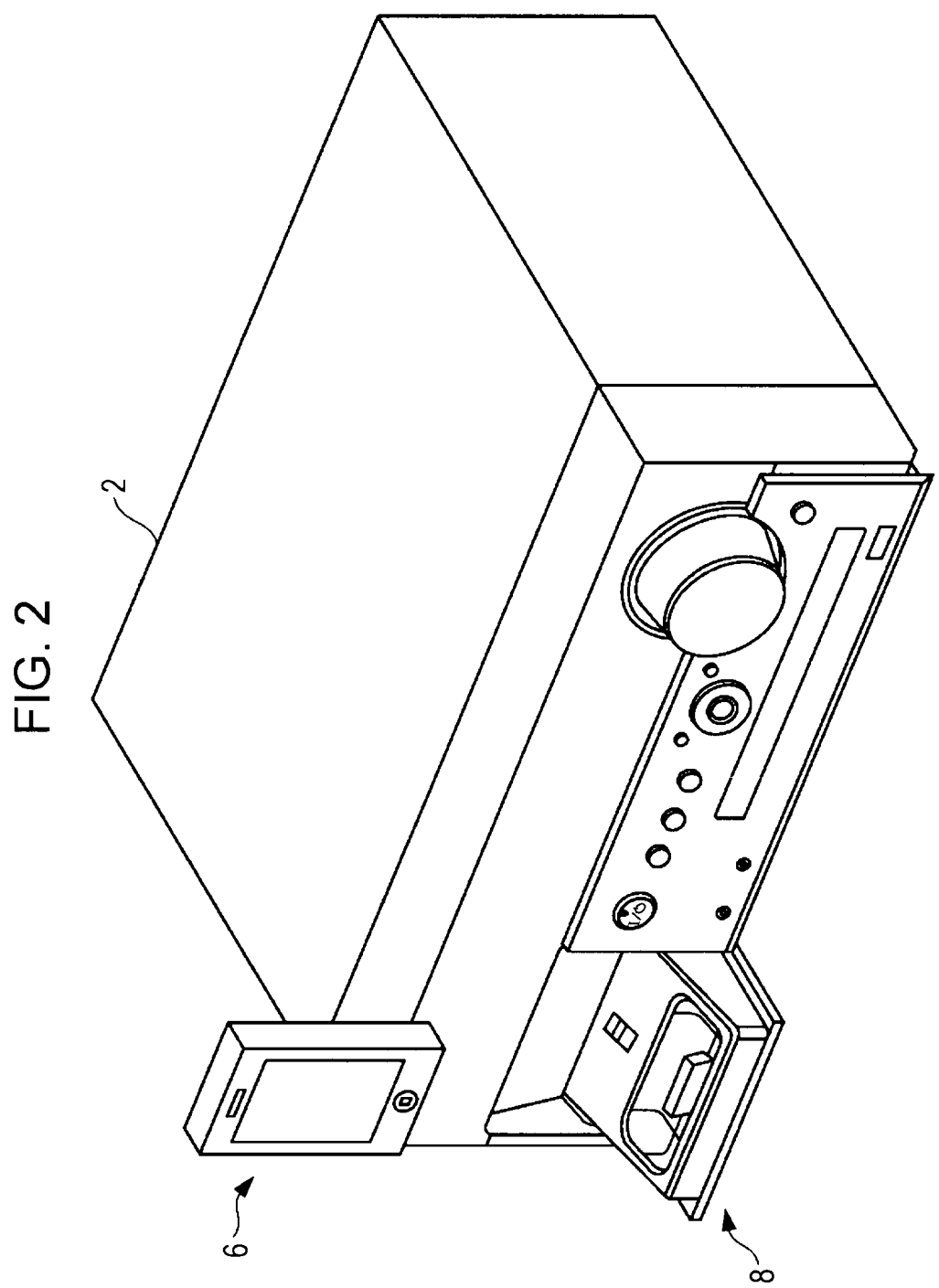
FIG. 2 is a diagram schematically illustrating an example of an external appearance of a device.

FIG. 2 shows an example of the external appearance of the device 2. The device 2 is provided with a connection section 8. The external device 6 is freely attached or detached with respect to the connection section 8. Further, while not shown in the drawing, a speaker corresponding to a 2-channel scheme or a multi-channel scheme which is an example of the DMR(L) 2b is connected to the device 2.

The external device 6 is mounted on the connection section 8, and the musical content which is reproduced by the external device 6, is supplied to the DMR(L) 2b or the DMP 3, so that the musical content can be reproduced using the DMR(L) 2b or the DMP 3. Since the DMR(L) 2b or the DMP 3 is generally higher quality than the speaker of the external device 6, a user can hear the musical content stored in the external device 6 with a higher quality. Further, the musical content which is reproduced by the external device 6, is supplied by streaming from the point of view of copyright protection, and thus it is not stored in the DMS 2a or the DMP 3. The musical content list or the attribute information of the respective musical content items can be stored in the DMS 2a or the DMP 3.

1-3. Outline of Operation

Figure 3:
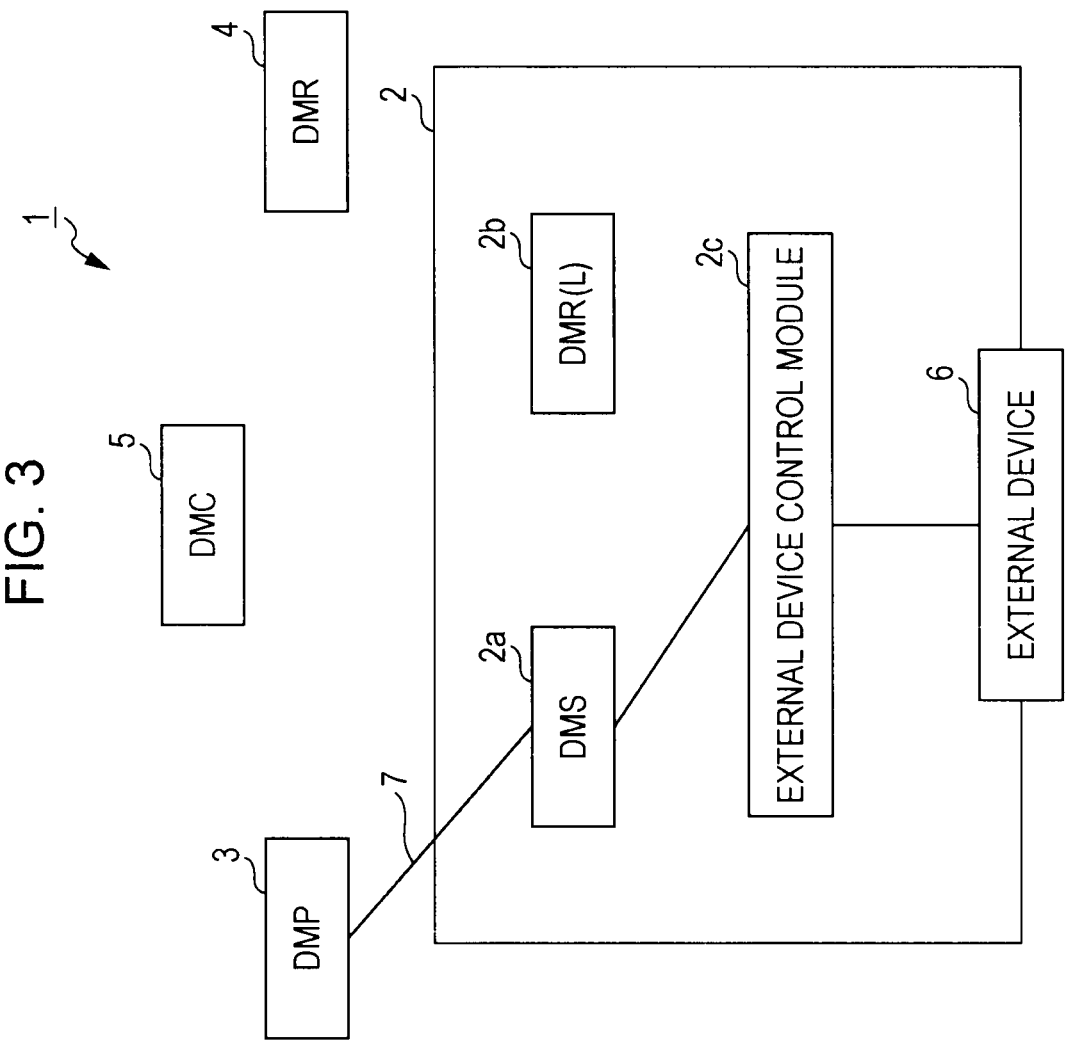
FIG. 3 is a diagram schematically illustrating an outline of operations according to a first embodiment.

Next, the outlines of the operations according to the first embodiment will be described with reference to FIG. 3. In the first embodiment, the DMP 3 is used as the reproduction device.

First, an operation for requesting the musical content list is performed on the DMP 3 by the user. According to the user operation, a reproduction request for the musical content list is transmitted from the DMP 3 to the device 2 via the LAN 7. Here, the musical content list is a list of the musical content items which are stored in the external device 6. The reproduction request for the musical content list which is transmitted from the DMP 3 is received by the DMS 2a of the device 2.

The DMS 2a supplies the reproduction request for the received musical content list to the external device control module 2c. The external device control module 2c supplies the external device 6 with the reproduction request for the musical content list which is supplied from the DMS 2a.

The external device 6 reproduces the musical content list from the memory according to the reproduction request for the musical content list. The reproduced musical content list is supplied to the external device control module 2c. The external device control module 2c supplies the DMS 2a with the musical content list which is supplied from the external device 6. The DMS 2a transmits the musical content list which is supplied from the external device control module 2c to the DMP 3.

The DMP 3 receives the musical content list which is transmitted from the DMS 2a. Then, the received musical content list is subjected to the reproduction process, and the musical content list is displayed in the display of the DMP 3. The user designates desired musical content from the musical content list which is displayed in the DMP 3. When the musical content is designated, the reproduction request for the designated musical content is transmitted from the DMP 3 to the device 2.

The reproduction request for the musical content is received by the DMS 2a of the device 2. The DMS 2a supplies the reproduction request for the received musical content to the external device control module 2c. The external device control module 2c supplies the external device 6 with the reproduction request for the musical content which is supplied from the DMS 2a.

The external device 6 reproduces the musical content which is designated by the supplied reproduction request, and supplies the reproduced musical content to the external device control module 2c. The external device control module 2c supplies the DMS 2a with the musical content which is reproduced by the external device 6. The DMS 2a transmits the musical content which is supplied from the external device control module 2c to the DMP 3. Further, the musical content which is reproduced by the external device 6 is supplied and transmitted by streaming from the point of view of copyright protection.

The DMP 3 receives the musical content which is transmitted from the DMS 2a, and performs a predetermined reproduction process on the received musical content. The musical content which is subjected to the reproduction process is reproduced from the speaker of the DMP 3. Hereinbefore, the outline of the operations when the DMP 3 is used as the reproduction device has been described.

1-4. Flow of Processing in the Related Art

In order to help with understanding of the first embodiment, the flow of the processing in the related art will be described with reference to FIG. 4. In other words, the external device 6 which is connected to the device 2 has been proposed by various manufacturers, and has also a different specification per the external device 6. In a case where only a part of the specification of the external device 6 is opened to the public, allowable control of the external device control module 2c with respect to the external device 6 may be limited. For example, according to the reproduction request for the above-mentioned musical content, the external device 6 begins to reproduce the designated musical content. However, when the reproduction of the designated musical content is completed, another musical content such as the musical content stored in the next track is reproduced based on the specification of the external device 6.

After the musical content which was requested to be reproduced by the user is ended, the musical content which is not requested to be reproduced is reproduced by the external device 6 and the reproduced musical content is supplied to the DMP 3. The supplied musical content is reproduced by the DMP 3. For this reason, there is a problem in that other musical content except the musical content which the user wishes to reproduce may be reproduced.

Furthermore, the DMP 3 may not be able to determine whether or not the musical content is switched. For this reason, for example, when the musical content is reproduced while displaying the attribute information such as a title, the DMP 3 may not be able to switch displaying of the attribute information according to the switching of the musical content. Then, there is a problem in that the musical content which is reproduced in the DMP 3 does not correspond to the attribute information which is displayed in the display of the DMP 3.

The problems in the related art will be described with reference to the sequence diagram of FIG. 4. In Step S1 in FIG. 4, the DMP 3 is operated by the user, and the reproduction request for the musical content list which is stored in the external device 6 is made. Then, the process proceeds to Step S2.

In Step S2, the reproduction request for the musical content list is transmitted from the DMP 3 to the device 2. The reproduction request for the musical content list is received by the DMS 2a of the device 2. The DMS 2a supplies the reproduction request for the received musical content list to the external device control module 2c. The external device control module 2c supplies the external device 6 with the reproduction request for the musical content list which is supplied from the DMS 2a. Then, the process proceeds to Step S3.

In Step S3, the external device 6 to which the reproduction request for the musical content list is supplied reproduces the musical content list from the memory, and supplies the reproduced musical content list to the external device control module 2c. The external device control module 2c supplies the DMS 2a with the musical content list which is supplied from the external device 6. The musical content list is transmitted from the DMS 2a to the DMP 3. Then, the process proceeds to Step S4.

In Step S4, the DMP 3 processes the musical content list which is transmitted from the DMS 2a to be displayed in the display. By displaying in the display of the DMP 3, the musical content list is posted to the user.

Further, in the process of Step S3, the attribute information such as a title of the musical content and a picture of a jacket-sleeve which are stored in the external device 6 may be reproduced by the external device 6. The attribute information which has been reproduced by the external device 6 may be transmitted to the DMP 3. In this example, in the process of Step S3, the attribute information which is reproduced by the external device 6 is transmitted to the DMP 3. The DMP 3 stores the transmitted attribute information in the memory. Then, the process proceeds to Step S5.

In Step S5, the user designates desired musical content to be reproduced. For example, while watching the musical content list which is displayed in the display, the operation of designating musical content is performed on the DMP 3. In this example, the x-th musical content from the head of the track is assumed to be designated. Then, the process proceeds to Step S6.

In Step S6, the reproduction request for the x-th musical content is transmitted from the DMP 3 to the device 2. The reproduction request which has been transmitted from the DMP 3 is received by the DMS 2a of the device 2. The DMS 2a supplies the received reproduction request to the external device control module 2c. An external device control module 2c supplies the external device 6 with the reproduction request which is supplied from the DMS 2a. Then, the process proceeds to Step S7.

In Step S7, the external device 6 reads and reproduces the x-th musical content which is requested to be reproduced from the memory. The reproduced musical content is supplied to the external device control module 2c. The external device control module 2c supplies the DMS 2a with the musical content which is supplied from the external device 6. The DMS 2a transmits the musical content which is supplied from the external device control module 2c to the DMP 3.

The musical content which is transmitted from the DMS 2a is received by the DMP 3. The DMP 3 reproduces the x-th musical content which is transmitted from the DMS 2a. Further, the musical content which is reproduced by the external device 6 is supplied by streaming from the point of view of copyright protection, and thus it may not be able to be stored in the DMS 2a or the DMP 3.

Figure 4:
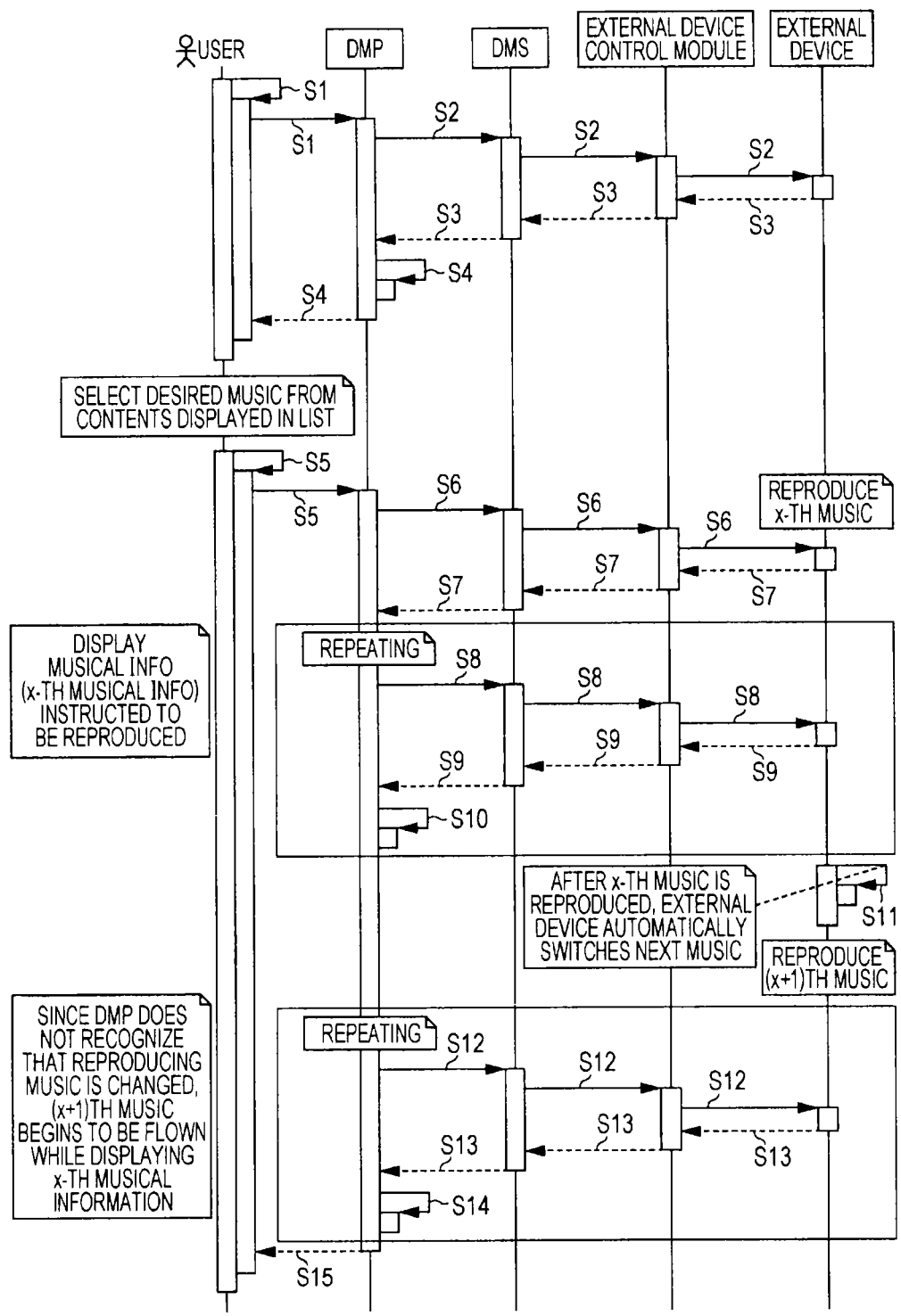
FIG. 4 is a sequence diagram illustrating the flow of processing in the related art.

In the example shown in FIG. 4, the musical content data of any track is processed by being divided. For example, before data of any block is completely processed, the DMP 3 requests for the data in the next block. In other words, the data request is repeatedly performed. The block data corresponding to the request is supplied from the external device 6, and transmitted to the DMP 3 according to the same flow as Step S7 described above. The transmitted musical content data is reproduced by the DMP 3 (the processes from Step S8 to Step S10).

Here, in Step S3, the attribute information of the musical content is supplied to the DMP 3. In addition, in Step S5, the DMP 3 can recognize that the musical content which is requested to be reproduced by the user is the x-th musical content. Therefore, when the x-th musical content is being reproduced, the DMP 3 can reproduce the attribute information corresponding to the x-th musical content, and display the reproduced attribute information in the display of the DMP 3. For example, when the x-th musical content is being reproduced, a title or a lap time of the x-th musical content is displayed in the display of the DMP 3.

Then, the process proceeds to Step S11. In Step S11, the reproduction of the x-th musical content is completed in the external device 6. Here, the external device 6 reproduces the musical content among the musical content which is requested to be reproduced. However, according to the specification of the external device 6, after reproducing the music requested to be reproduced, the musical content of the next track may be reproduced. In other words, when the x-th musical content is completely reproduced, the external device 6 reproduces the (x+1)th musical content which is stored on the next track.

In addition, the DMP 3 may not be able to recognize that the x-th musical content is completely reproduced. For this reason, the process of requesting for reproducing the musical content is repeatedly performed. Then, the (x+1)th musical content which is reproduced in the external device 6 is supplied to the DMP 3, and the (x+1)th musical content is reproduced by the DMP 3 (the processes from Step S12 to Step S14). Therefore, after desired musical content of the user is completely reproduced, another musical content is reproduced.

Furthermore, since it may not be able to be recognized that the reproduction of the x-th musical content is completed in the DMP 3, the attribute information may not be able to be switched while it is being displayed according to the switching of the musical content. For this reason, while the attribute information of the x-th musical content is being displayed in the display of the DMP 3, the (x+1)th musical content is reproduced.

1-5. Flow of Processing in the First Embodiment

In the first embodiment, when the reproduction of the musical content which has been requested for reproduction is completed, the external device control module 2c performs a control of stopping the reproduction process of the external device 6. Hereinafter, the flow of processing in the first embodiment will be described with reference to FIGS. 5 and 6.

Figure 5:
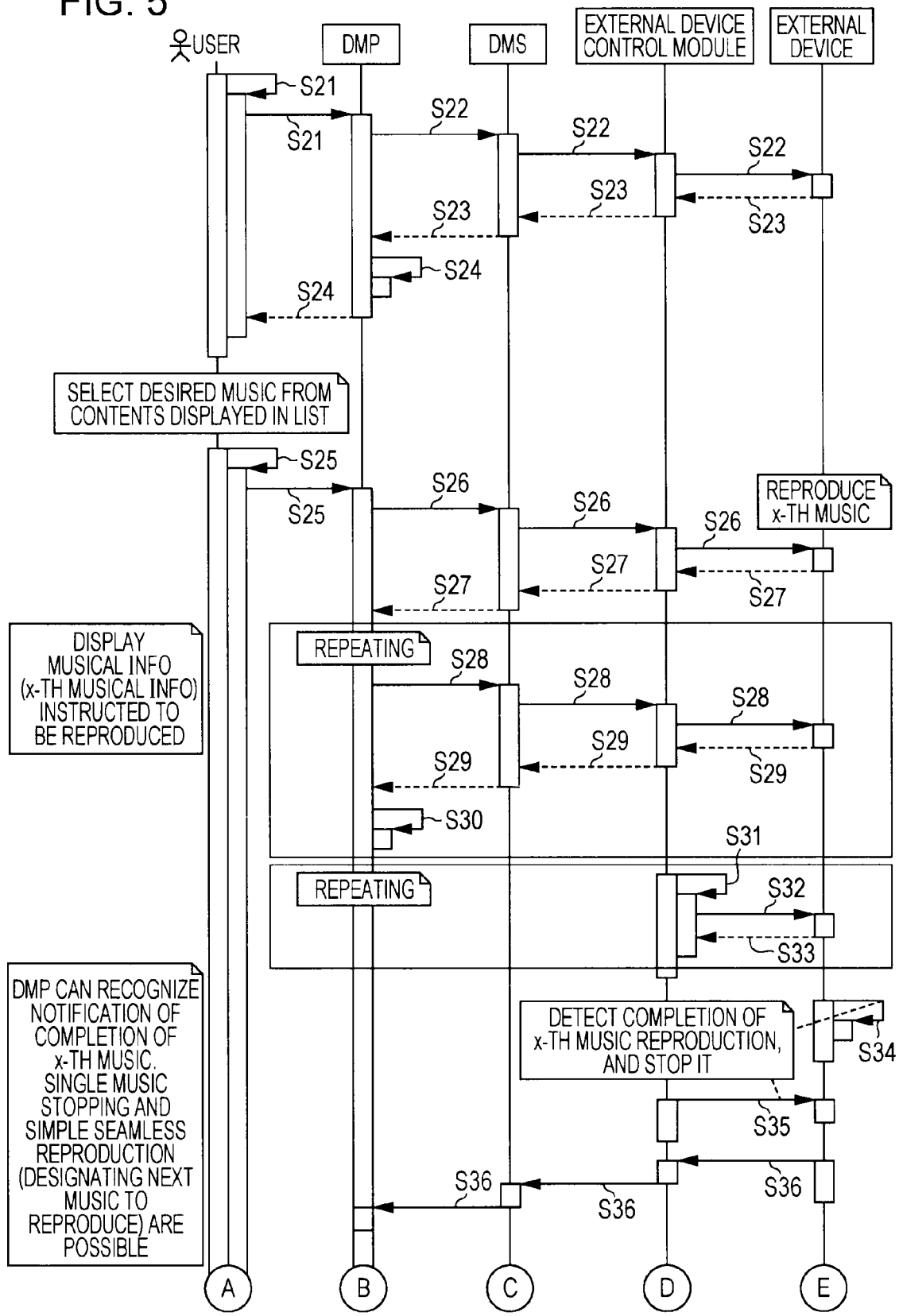
FIG. 5 is a sequence diagram illustrating the flow of processing according to the first embodiment.

In Step S21 of FIG. 5, the user performs an operation for performing the reproduction request for the musical content list with respect to the DMP 3. Then, the process proceeds to Step S22, and the reproduction request for the musical content list is transmitted from the DMP 3 to the device 2. The reproduction request for the musical content list is received by the DMS 2a of the device 2. The DMS 2a supplies the reproduction request for the received musical content list to the external device control module 2c. The external device control module 2c supplies the external device 6 with the reproduction request for the musical content list which has been supplied. Then, the process proceeds to Step S23.

In Step S23, the external device 6 reproduces the musical content list according to the reproduction request, and supplies the reproduced musical content list to the external device control module 2c. The external device control module 2c supplies the DMS 2a with the musical content list which is supplied from the external device 6. The DMS 2a transmits the musical content list which is supplied from the external device control module 2c to the DMP 3. The DMP 3 receives the musical content list which is transmitted from the DMS 2a. Then, the process proceeds to Step S24.

In Step S24, the DMP 3 performs the reproduction process of the received musical content list. Then, the musical content list is displayed in the display of the DMP 3, and the musical content list is posted to the user. Then, the process proceeds to Step S25.

Further, in the process of Step S23, the attribute information such as a title and a picture of a jacket-sleeve of the musical content which is stored in the external device 6 may be reproduced by the external device 6. The attribute information which has been reproduced by the external device 6 may be transmitted to the DMP 3. In this example, the attribute information is reproduced from the external device 6, and the reproduced attribute information is transmitted to the DMP 3. The DMP 3 stores the transmitted attribute information in a memory (not shown) and the like.

In Step S25, using the musical content list, the user designates musical content which is desired to be reproduced. Here, the x-th musical content from the head of the track is assumed to be designated. Then, the process proceeds to Step S26.

In Step S26, the reproduction request for the x-th musical content is transmitted from the DMP 3 to the device 2. The reproduction request for the x-th musical content is received by the DMS 2*a* of the device 2. The DMS 2*a* supplies the reproduction request for the received musical content to the external device control module 2*c*. An external device control module 2*c* supplies the external device 6 with the reproduction request for the musical content which is supplied from the DMS 2*a*. Then, the process proceeds to Step S27.

In Step S27, the external device 6 begins to reproduce the x-th musical content which has been requested for reproducing. The reproduced musical content is supplied to the external device control module 2*c*. The external device control module 2*c* supplies the DMS 2*a* with the musical content which has been reproduced by the external device 6. The DMS 2*a* transmits the musical content, which has been supplied from the external device control module 2*c*, to the DMP 3. The DMP 3 receives the musical content which has been transmitted from the DMS 2*a*, and reproduces the received musical content. Further, the musical content which has been reproduced by the external device 6 is supplied by streaming from the point of view of copyright protection.

In Steps S28 to S30, when the data of the musical content is divided and processed, the reproduction request for data from the DMP 3 is repeated. The divided data is transmitted from the external device 6 to the DMP 3 in response to the reproduction request, and the transmitted musical content is reproduced by the DMP 3.

Here, in Step S23, the attribute information of the musical content is supplied to the DMP 3. In addition, in Step S25, the DMP 3 can recognize that the musical content which is requested to be reproduced by the user is the x-th musical content. Therefore, when the x-th musical content is being reproduced, the DMP 3 can read the attribute information corresponding to the x-th musical content, and display the reproduced attribute information in the display of the DMP 3. For example, when the x-th musical content is being reproduced, the DMP 3 displays a title or a lap time of the x-th musical content in the display of the DMP 3.

The external device control module 2*c* performs the processes of Steps S31 to S33 in parallel with the process in which the musical content reproduced by the external device 6 is supplied to the DMS 2*a*. In Steps S31 and S32, the external device control module 2*c* requests the external device 6 to obtain the reproduction time information of the musical content which is requested to be reproduced. In this example, in Step S26, the x-th musical content is requested to be reproduced. Therefore, the external device control module 2*c* requests the external device 6 to obtain the reproduction time information of the x-th musical content. Then, the process proceeds to Step S33.

In Step S33, the external device 6 reproduces the reproduction time information of the x-th musical content according to acquisition request for the reproduction time information. The reproduction time information of the reproduced x-th musical content is supplied from the external device 6 to the external device control module 2*c*.

Then, the process returns to Step S31, and the external device control module 2*c* measures the reproduction time. For example, in the process of Step S27, the external device control module 2*c* measures time in the unit of msec from a point of time when the external device control module 2*c* begins to supply the musical content to the DMS 2*a*. When the data of the musical content is divided and supplied to the external device control module 2*c*, the process of measuring the reproduction time is repeated. Then, the process proceeds to Step S34.

In Step S34, the reproduction of the x-th musical content is completed in the external device 6. The external device control module 2*c* can determine that the x-th musical content is completely reproduced on the basis that the measurement time is the same as the reproduction time information of the x-th musical content which is acquired from the external device 6. Then, the process proceeds to Step S35. In Step S35, after the determination that the x-th musical content is completely reproduced, the external device control module 2*c* performs a reproduction stop request for the external device 6. Then, the process proceeds to Step S36.

In Step S36, the external device 6 stops the reproduction process of the x-th musical content in response to the reproduction stop request from the external device control module 2*c*. Then, the external device 6 supplies the external device control module 2*c* with a state change notification to inform of that the reproduction process has stopped. The external device control module 2*c* supplies the DMS 2*a* with the state change notification which is supplied from the external device 6. The DMS 2*a* transmits the state change notification which is supplied from the external device control module 2*c* to the DMP 3.

The state change notification which is transmitted from the DMS 2*a* is received by the DMP 3. The DMP 3 which has received the state change notification stops the reproduction process, and stops the transmission of the reproduction request for the musical content. In accordance to that the external device 6 stops the reproduction process, the DMP 3 can stop the reproduction process, and can synchronize the processes of the respective devices.

In this way, when the reproduction of the musical content which has been requested for reproduction is completed, the reproduction process of the external device 6 can be stopped. Therefore, after the reproduction of the musical content which has been requested for reproduction is completed, no other musical content is reproduced. In addition, even when the musical content which has been reproduced by the external device 6 mounted on the device 2 is supplied by streaming from the point of view of copyright protection, it is possible to determine that the reproduction of the musical content is completed.

Figure 6:
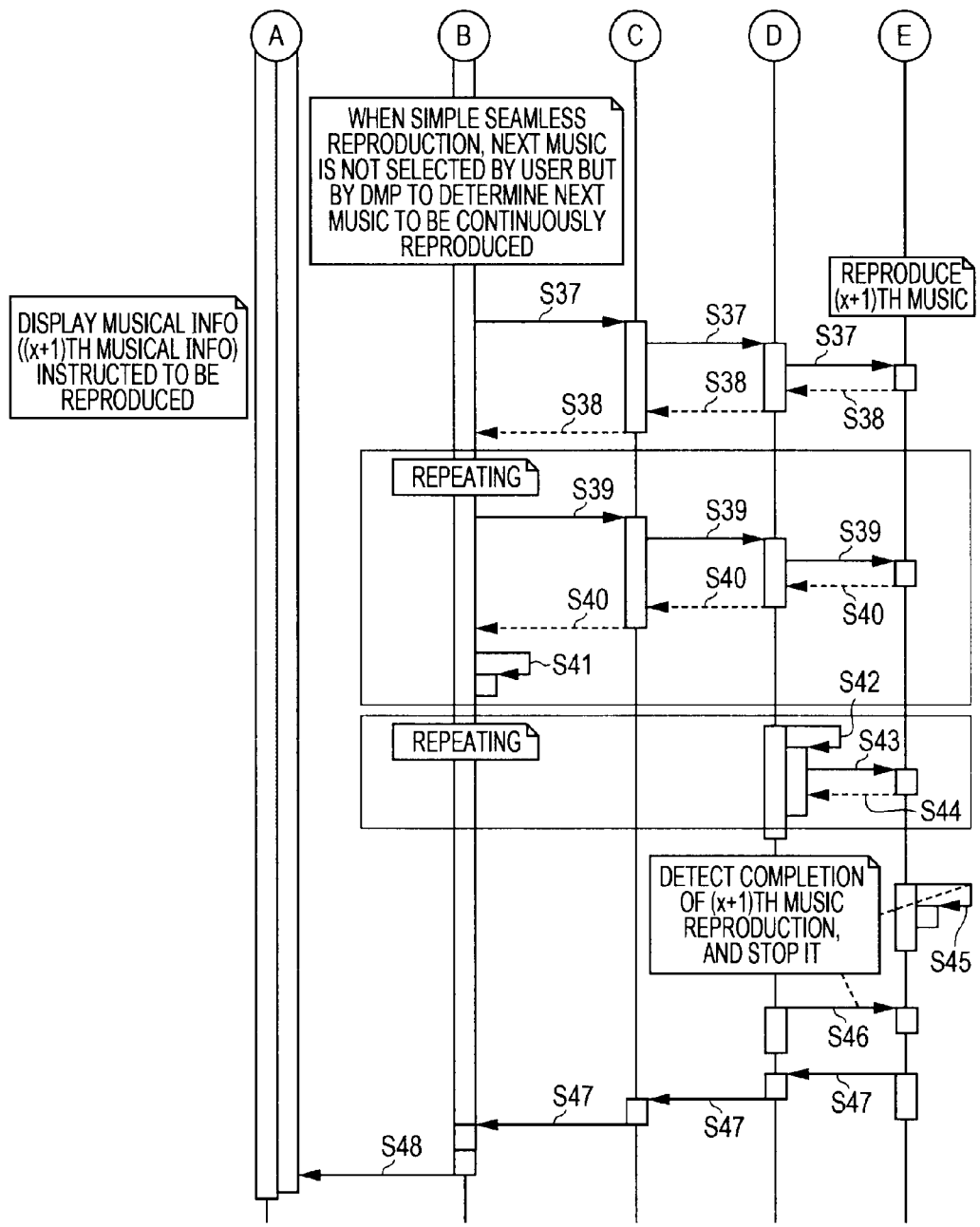
FIG. 6 is a sequence diagram illustrating the flow of processing according to the first embodiment.

After the process of Step S36 of FIG. 5 is completed, the process shown in FIG. 6 may be performed. Further, A, B, C, D, and E shown in FIGS. 5 and 6 represent continuity of the processes, but not specific processes.

In response to the state change notification, the DMP 3 can perform a simple seamless reproduction. Here, simple seamless reproduction is a process in which the next musical content is automatically reproduced without the user designating the next track. As described above, after the x-th musical content is reproduced and then the simple seamless reproduction is performed, the (x+1)th musical content which is the musical content on the next track is reproduced.

In Step S37, the DMP 3 which has received the state change notification transmits the reproduction request for the (x+1)th musical content to the device 2. The DMS 2a of the device 2 receives the reproduction request for the (x+1)th musical content which has been transmitted from the DMP 3. The DMS 2a supplies the reproduction request for the received musical content to the external device control module 2c. The external device control module 2c supplies the external device 6 with the reproduction request for the musical content which has been supplied from the DMS 2a. Then, the process proceeds to Step S38.

In Step S38, the external device 6 reproduces the (x+1)th musical content in response to the reproduction request which has been supplied from the external device control module 2c. The musical content which has been reproduced by the external device 6 is supplied to the external device control module 2c. The external device control module 2c supplies the DMS 2a with the musical content which has been supplied from the external device 6. The musical content is transmitted from the DMS 2a to the DMP 3.

The DMP 3 receives the musical content which has been transmitted from the DMS 2a, and performs the reproduction process on the received musical content. Then, the (x+1)th musical content is reproduced by the DMP 3. Further, the musical content which has been reproduced by the external device 6 is supplied by streaming from the point of view of copyright protection.

Here, as described using FIG. 5, the DMP 3 can recognize that the reproduction of the x-th musical content is completed by receiving the state change notification. In addition, in Step S37, the musical content which has been requested for reproduction can be recognized as the (x+1)th musical content. Therefore, for example, the DMP 3 can reproduce the attribute information of the (x+1)th musical content along with the process of Step S37, and display the reproduced attribute information in the display of the DMP 3. In this way, once the next musical content is reproduced after the reproduction of the musical content stops, the attribute information corresponding to the next musical content can be posted to the user.

The following processes will be simply described since these are the same as those of Steps S28 to S36 described using FIG. 5. In Step S39 to Step S41, the process of acquiring the data of the (x+1)th musical content which is divided and supplied is repeated. In Step S42 to Step S44, the external device control module 2c acquires the reproduction time information of the (x+1)th musical content from the external device 6. Then, in Step S42, the external device control module 2c measures the reproduction time. For example, in the process of Step S38, the external device control module 2c measures time in the unit of msec from a point of time when the external device control module 2c begins to supply the musical content to the DMS 2a.

In Step S45, the reproduction of the (x+1)th musical content is completed. The time which is being measured the external device control module 2c reaches the reproduction time information of the (x+1)th musical content, and by this the external device control module 2c can determine that the reproduction of the (x+1)th musical content is completed. Then, the process proceeds to Step S46. In Step S46, the external device control module 2c supplies the reproduction stop request to the external device 6. Then, the process proceeds to Step S47.

In Step S47, the external device 6 stops the reproduction process of the musical content in response to the reproduction stop request. Then, the external device 6 supplies the external device control module 2c with the state change notification to inform of that the reproduction of the musical content has stopped. The external device control module 2c supplies the DMS 2a with the state change notification which is supplied from the external device 6. The DMS 2a transmits the state change notification which is supplied from the external device control module 2c to the DMP 3.

The DMP 3 receives the state change notification which is transmitted from the DMS 2a, stops the reproduction request for the musical content. The DMP 3 which has received the state change notification can recognize that the reproduction of the (x+1)th musical content is completed. Then, the process proceeds to Step S48, and a series of processes is completed. Further, as the simple seamless reproduction, the reproduction of the (x+2)th musical content which is the next musical content may be reproduced.

Second Embodiment

Next, a second embodiment will be described. Since the configuration of the system, the configuration of the device 2, and the appearance of the device 2 according to the second embodiment are the same as those in the above-mentioned first embodiment, the description already given will be omitted.

2-1. Outline of Operations

Figure 7:
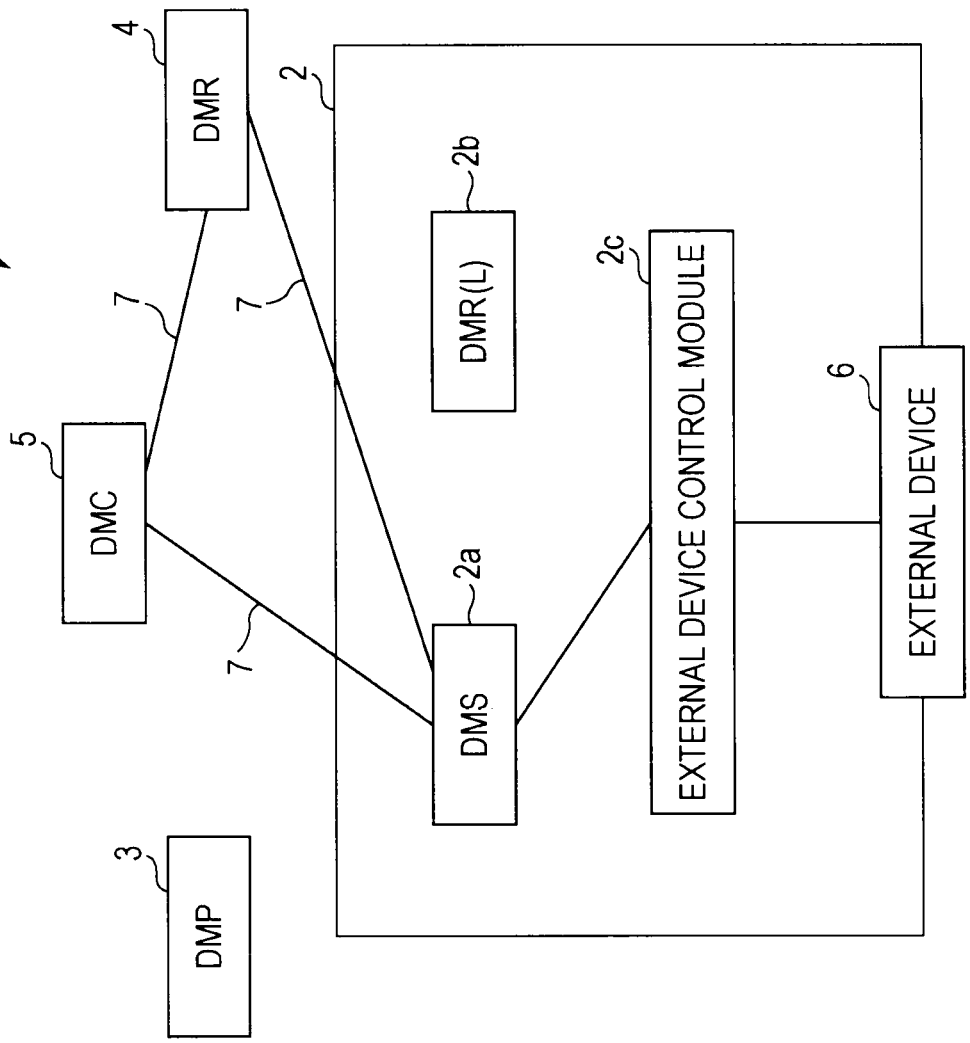
FIG. 7 is a diagram schematically illustrating an outline of operations according to a second embodiment.

The operations according to the second embodiment will be described with reference to FIG. 7. In the second embodiment, the DMR 4 which is separately formed from the device 2 is used as the reproduction device, and as an example of another device the DMC 5 is used.

First, the DMC 5 is operated by the user, and the reproduction request for the musical content list is transmitted from the DMC 5 to the device 2 via LAN 7. The reproduction request for the musical content list is received by the DMS 2a of the device 2. The DMS 2a supplies the reproduction request for the received musical content list to the external device control module 2c. The external device control module 2c supplies the external device 6 with the reproduction request for the musical content list which has been supplied from the DMS 2a.

The external device 6 reproduces the musical content list from the memory in response to the reproduction request for the musical content list, and supplies the reproduced musical content list to the external device control module 2c. The external device control module 2c supplies the DMS 2a with the musical content list which has been supplied from the external device 6. The DMS 2a transmits the musical content list which has been supplied from the external device control module 2c to the DMC 5 via LAN 7.

The DMC 5 receives the musical content list which has been transmitted from the DMS 2a. Then, the DMC 5 performs the reproduction process on the received musical content list, and displays the musical content list in the display of the DMC 5. The user designates desired musical content among the musical content list which is displayed in the DMC 5. When the musical content is designated, the reproduction request for the designated musical content is transmitted from the DMC 5 to the DMR 4.

The reproduction request for the musical content is received by the DMR 4. The DMR 4 transmits the reproduction request for the received musical content to the device 2. The reproduction request for the musical content which has been transmitted from the DMR 4 is received by the DMS 2a of the device 2. The DMS 2a supplies the reproduction request for the received musical content to the external device control module 2c. The external device control module 2c supplies the external device 6 with the reproduction request for the musical content which has been supplied from the DMS 2a.

The external device 6 reproduces the musical content corresponding to the reproduction request for the musical content, and supplies the reproduced musical content to the external device control module 2c. The external device control module 2c supplies the DMS 2a with the musical content which has been reproduced by the external device 6. The DMS 2a transmits the musical content which has been supplied from the external device control module 2c to the DMR 4.

The DMR 4 receives the musical content which has been transmitted from the DMS 2a, and performs a predetermined reproduction process on the received musical content. The musical content which has been subjected to the reproduction process is reproduced from a speaker of the DMR 4. Hereinbefore, the outline of the operations when the DMR 4 is used as the reproduction device and the DMC 5 is used as another device has been described.

2-2. Flow of Processing in the Related Art

In order to help with understanding of the second embodiment, the flow of processing in the related art will be described with reference to FIG. 8. In Step S51 of FIG. 8, the DMC 5 is operated by the user, and the musical content list is requested to be reproduced. Then, the process proceeds to Step S52.

In Step S52, the reproduction request for the musical content list is transmitted from the DMC 5 to the device 2. The reproduction request for the musical content list is received by the DMS 2a of the device 2. The DMS 2a supplies the reproduction request for the received musical content list to the external device control module 2c. The external device control module 2c supplies the external device 6 with the reproduction request for the musical content list which has been supplied from the DMS 2a. Then, the process proceeds to Step S53.

In Step S53, the external device 6 reproduces the musical content list from the memory in response to the reproduction request, and supplies the reproduced musical content list to the external device control module 2c. The external device control module 2c supplies the DMS 2a with the musical content list which has been supplied from the external device 6. The DMS 2a transmits the musical content list to the DMC 5. The DMC 5 receives the musical content list which has been transmitted from the DMS 2a. Then, the process proceeds to Step S54.

In Step S54, the DMC 5 performs a process of displaying the received musical content list in the display of the DMC 5. Further, in the process of Step S53, the attribute information such as a title of the musical content and a picture of a jacket-sleeve which are stored in the external device 6 may be reproduced by the external device 6, and the reproduced attribute information may be transmitted to the DMC 5. In this example, the attribute information which has been reproduced by the external device 6 may be transmitted to the DMP 5. The DMC 5 stores the transmitted attribute information in the memory (not shown) and the like. Then, the process proceeds to Step S55.

In Step S55, the user designates a desired musical content to be reproduced. For example, while watching the musical content list which is displayed in the display of the DMC 5, the operation of designating a musical content is performed. Here, the x-th musical content from the head of the track is assumed to be designated. Then, the process proceeds to Step S56.

In Step S56, the reproduction request for the x-th musical content is transmitted from the DMP 5 to the DMR 4. The DMR 4 transmits the reproduction request for the musical content which has been transmitted from the DMC 5 to the device 2. The reproduction request which has been transmitted from the DMC 5 is received by the DMS 2a of the device 2. The DMS 2a supplies the received reproduction request to the external device control module 2c. An external device control module 2c supplies the external device 6 with the reproduction request which is supplied from the DMS 2a. Then, the process proceeds to Step S57.

In Step S57, the external device 6 reads and reproduces the x-th musical content which is requested to be reproduced from the memory. The reproduced musical content is supplied to the external device control module 2c. The external device control module 2c supplies the DMS 2a with the musical content which is supplied from the external device 6. The DMS 2a transmits the musical content which is supplied from the external device control module 2c to the DMR 4. The DMR 4 receives the x-th musical content which has been transmitted from the DMS 2a, and reproduces the received musical content. Further, the musical content which is reproduced by the external device 6 is supplied by streaming from the point of view of copyright protection.

Figure 8:
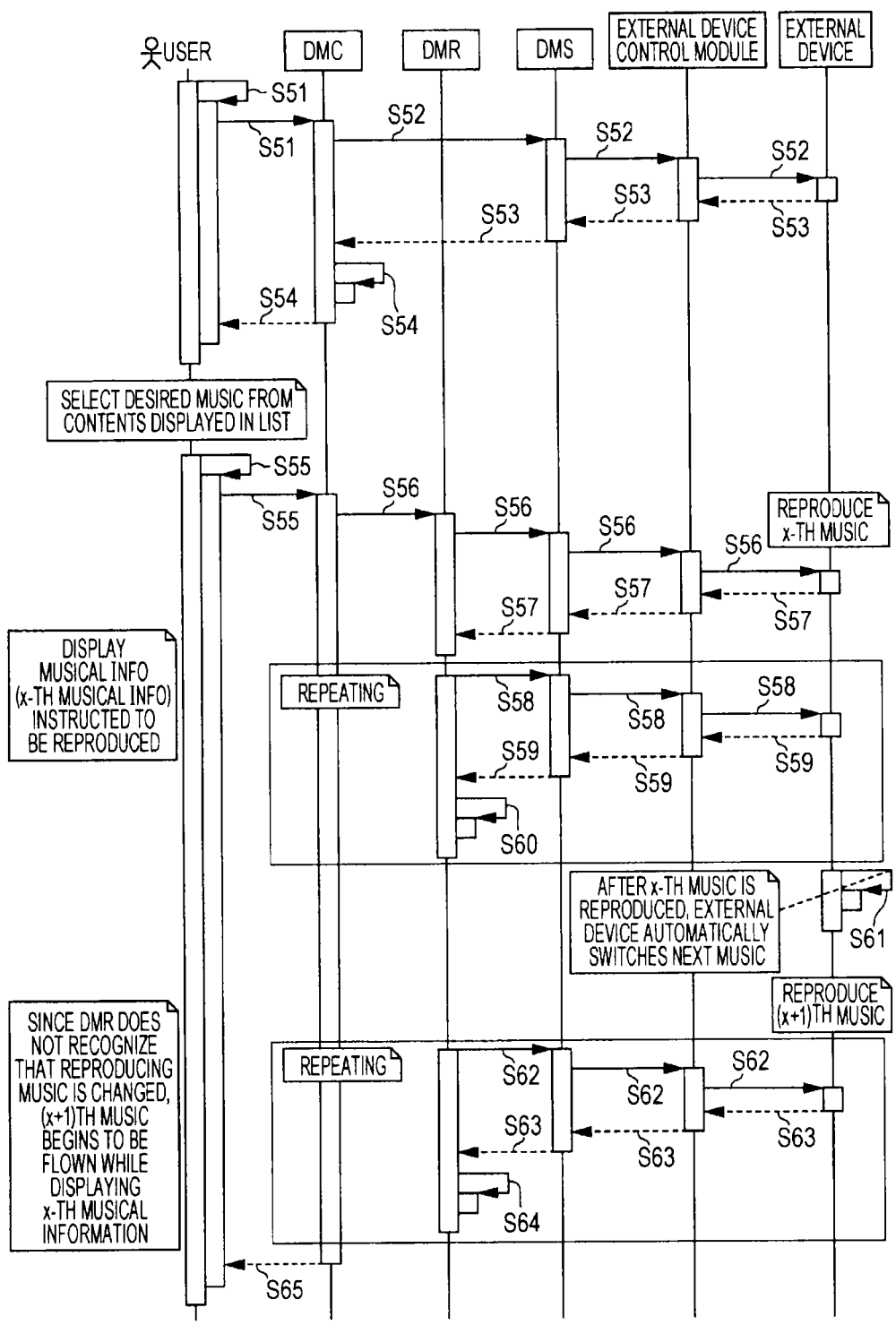
FIG. 8 is a sequence diagram illustrating the flow of processing in the related art.

In the example shown in FIG. 8, the musical content data of any track is processed by being divided. For example, before data of any block is completely processed, the DMR 4 requests for the data in the next block. In other words, the data request is repeatedly performed. The data corresponding to the request is supplied from the external device 6, and transmitted to the DMR 4 according to the same flow as Step S57 described above. The transmitted musical content data is reproduced by the DMR 4 (the processes from Step S58 to Step S60).

Here, in Step S53, the attribute information of the musical content is supplied to the DMC 5. In addition, in Step S55, the DMC 5 can recognize that the musical content which is requested to be reproduced is the x-th musical content. Therefore, when the x-th musical content is being reproduced, the DMC 5 can read the attribute information corresponding to the x-th musical content, and display the reproduced attribute information in the display. For example, when the x-th musical content is being reproduced, the DMC 5 displays a title of the x-th musical content is displayed in the display.

Then, the process proceeds to Step S61. In Step S61, the reproduction of the x-th musical content is completed. Here, the external device 6 reproduces the musical content which is requested to be reproduced from the musical content. However, according to the specification of the external device 6, after the external device 6 reproduces the music requested to be reproduced, the musical content of the next track may be reproduced. In other words, when the x-th musical content is completely reproduced, the external device 6 reproduces the (x+1)th musical content which is stored on the next track.

In addition, the DMR 4 may not be able to recognize that the x-th musical content is completely reproduced. For this reason, the process of requesting for reproducing the musical content is repeatedly performed. Then, the (x+1)th musical content which is reproduced in the external device 6 is supplied to the DMR 4, in the same flow as that of Step S57. The (x+1)th musical content is reproduced by the DMR 4 (the processes from Step S62 to Step S65). Therefore, after a desired musical content of the user is completely reproduced, a musical content which is different from the desired musical content to be reproduced is reproduced.

Furthermore, it may not be able to be recognized that the reproduction of the x-th musical content is completed in the DMC 5. For this reason, in synchronization with the switching of music which is reproduced from the DMR 4, the attribute information which is displayed in the display of the DMC 5 may not be able to be updated. For example, while the attribute information of the x-th musical content is being displayed in the display of the DMC 5, the (x+1)th musical content is reproduced from the DMR 4.

2-3. Flow of Processing in the Second Embodiment

In the second embodiment, when the reproduction of the musical content which has been requested for reproduction is completed, the external device control module 2c performs a control of stopping the reproduction process of the external device 6. Hereinafter, the flow of processing in the second embodiment will be described with reference to FIGS. 9 and 10.

Figure 9:
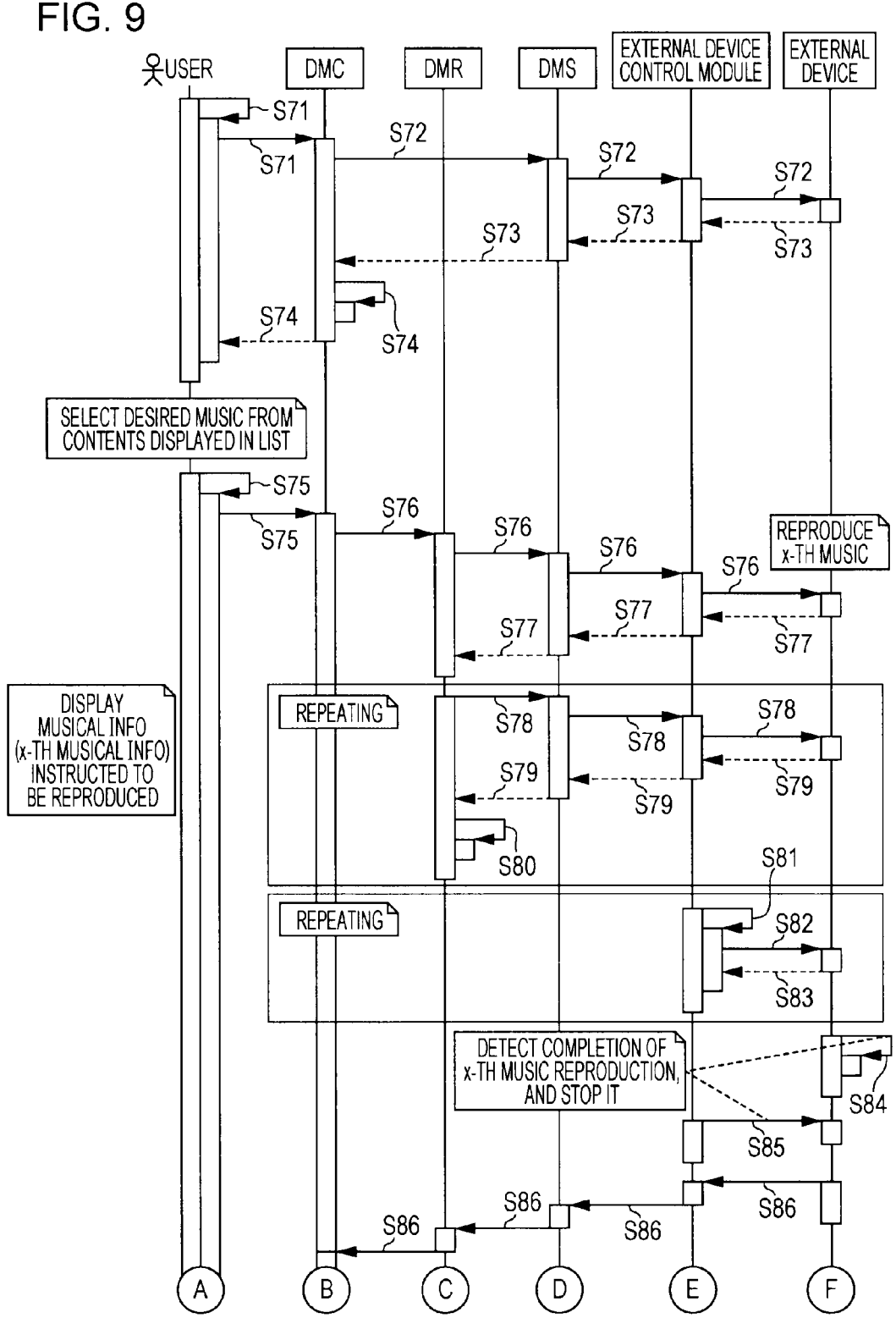
FIG. 9 is a sequence diagram illustrating the flow of processing according to the second embodiment.

In Step S71 of FIG. 9, the user performs an operation for performing the reproduction request for the musical content list with respect to the DMC 5. Then, the process proceeds to Step S72. In Step S72, the reproduction request for the musical content list is transmitted from the DMC 5 to the device 2. The reproduction request for the musical content list which has been transmitted is received by the DMS 2a of the device 2. The DMS 2a supplies the reproduction request for the received musical content list to the external device control module 2c. The external device control module 2c supplies the external device 6 with the reproduction request for the musical content list which has been supplied from the DMS 2a. Then, the process proceeds to Step S73.

In Step S73, the external device 6 reproduces the musical content list according to the reproduction request, and supplies the reproduced musical content list to the external device control module 2c. The external device control module 2c supplies the DMS 2a with the musical content list which is supplied from the external device 6. The DMS 2a transmits the musical content list, which is supplied from the external device control module 2c, to the DMC 5. Then, the process proceeds to Step S74.

In Step S74, the DMC 5 receives the musical content list which has been transmitted from the DMS 2a. Then, the DMC 5 performs a predetermined reproduction process on the received musical content list, and displays the musical content list in the display of the DMC 5. The musical content list is posted to the user. Then, the process proceeds to Step S75.

Further, in the process of Step S73, the attribute information such as a title and a picture of a jacket-sleeve of the musical content which is stored in the external device 6 may be reproduced by the external device 6, and the attribute information which has been reproduced may be transmitted to the DMC 5. In this example, the attribute information which has been reproduced by the external device 6 is transmitted to the DMC 5. The DMC 5 stores the transmitted attribute information in a memory (not shown) and the like.

In Step S75, using the musical content list which has been displayed in DMC 5, the user designates a musical content which is desired to be reproduced. Here, the x-th musical content from the head of the track is assumed to be designated. Then, the process proceeds to Step S76.

In Step S76, the reproduction request for the designated musical content is transmitted from the DMC 5 to the DMR 4. The DMR 4 receives the reproduction request for the musical content which has been transmitted from the DMC 5, and transmits the reproduction request for the received musical content to the device 2. The reproduction request for the musical content which has been transmitted from the DMR 4 is received by the DMS 2a of the device 2. The DMS 2a supplies the reproduction request for the received musical content to the external device control module 2c. The external device control module 2c supplies the external device 6 with the reproduction request for the musical content which has been supplied from the DMS 2a. Then, the process proceeds to Step S77.

In Step S77, the external device 6 begins to reproduce the x-th musical content. The reproduced musical content is supplied to the external device control module 2c. The external device control module 2c supplies the DMS 2a with the musical content which has been reproduced by the external device 6. The DMS 2a transmits the musical content, which has been supplied from the external device control module 2c, to the DMR 4. The DMR 4 receives the musical content which has been transmitted from the DMS 2a, and reproduces the received musical content. Further, the musical content which has been reproduced by the external device 6 is supplied by streaming from the point of view of copyright protection.

In Steps S78 to S80, when the data of the musical content is divided and supplied, the reproduction request for data from the DMR 4 is repeated. The divided data is transmitted from the external device 6 to the DMR 4 in response to the reproduction request, and the transmitted musical content is reproduced by the DMR 4.

Here, in Step S73, the attribute information of the musical content is supplied to the DMC 5. In addition, in Step S75, the DMC 5 can recognize that the musical content which is requested to be reproduced by the user is the x-th musical content. Therefore, for example, when the reproduction request for the musical content is requested for reproduction in Step S75, the DMC 5 can display the attribute information corresponding to the x-th musical content which has been requested for reproduction in the DMC 5. The user, while hearing the x-th musical content, can watch the attribute information of the x-th musical content which has been displayed in the DMC 5.

The external device control module 2c performs the processes of Steps S81 to S83 in parallel with the process in which the musical content reproduced by the external device 6 is supplied to the DMS 2a. In Step S81 and Step S82, the external device control module 2c requests the external device 6 to obtain the reproduction time information of the musical content which is requested to be reproduced.

In this example, since the x-th musical content is requested for reproduction in the process of Step S76, the external device control module 2c requests the external device 6 to obtain the reproduction time information of the x-th musical content. Then, the process proceeds to Step S83. In Step S83, in response to the request from the external device control module 2c, the reproduction time information of the x-th musical content is reproduced by the external device 6. The reproduction time information of the reproduced x-th musical content is supplied from the external device 6 to the external device control module 2c.

Then, the process returns to Step S81, and the external device control module 2c measures the reproduction time. For example, in the process of Step S77, the external device control module 2c measures time in the unit of msec from a point of time when the external device control module 2c begins to supply the musical content to the DMS 2a. When the musical content is divided and supplied, the process of measuring time is repeated. Then, the process proceeds to Step S84.

In Step S84, the reproduction of the x-th musical content is completed. The external device control module 2c can determine that the x-th musical content is completely reproduced on the basis of that the measurement time reaches the reproduction time information of the x-th musical content. Then, the process proceeds to Step S85. In Step S85, after the x-th musical content is completely reproduced, the external device control module 2c performs reproduction stop request for the external device 6. Then, the process proceeds to Step S86.

In Step S86, the external device 6 stops the reproduction process of the musical content in response to the reproduction stop request from the external device control module 2c. Then, the external device 6 supplies the external device control module 2c with a state change notification to inform of that the reproduction process has stopped. The external device control module 2c supplies the DMS 2a with the state change notification which is supplied from the external device 6. The DMS 2a transmits the state change notification which is supplied from the external device control module 2c to the DMR 4.

The state change notification which is transmitted from the DMS 2a is received by the DMR 4. The DMR 4 which has received the state change notification stops the reproduction process of the musical content, and stops the transmission of the reproduction request for the musical content.

In this way, when the reproduction of the musical content which has been requested for reproduction is completed, the reproduction process of the external device 6 can be stopped. Therefore, no other musical content except the musical content which has been requested for reproduction is reproduced. In addition, as the external device 6 stops the reproduction process, the DMR 4 also can stop the reproduction process, and be synchronized with the processes of the respective devices. Furthermore, from the point of view of copyright protection, even when the musical content which has been reproduced by the external device 6 is supplied by streaming, the DMR 4 and the like can determine that the reproduction of the musical content is completed.

Further, the DMR 4 may transmit the received state change notification to the DMC 5. In this example, the state change notification is transmitted from the DMR 4 to the DMC 5, and the transmitted state change notification is received by the DMC 5.

Figure 10:
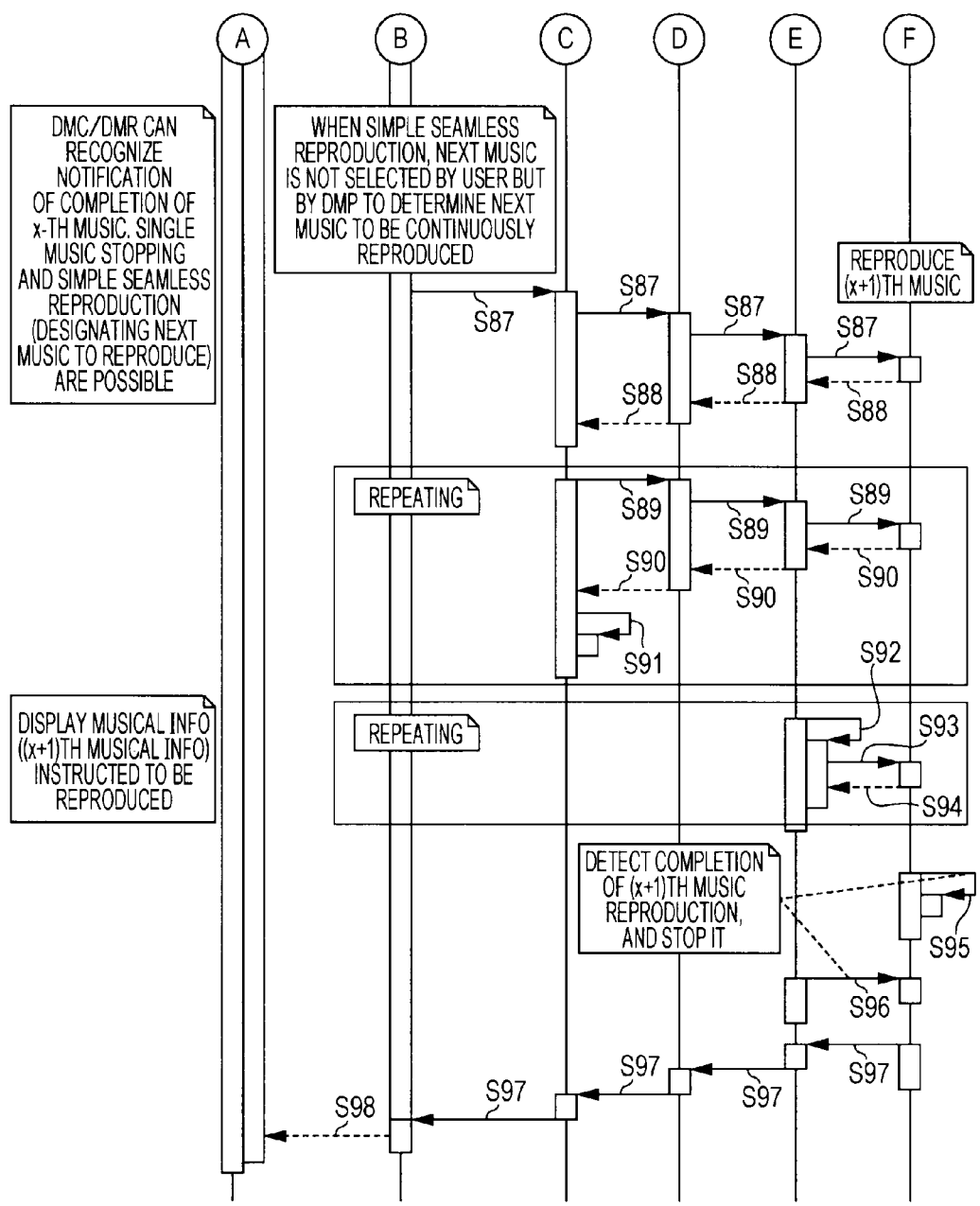
FIG. 10 is a sequence diagram illustrating the flow of processing according to the second embodiment.

After the process of Step S86 of FIG. 9 is completed, the process shown in FIG. 10 may be performed. Further, A, B, C, D, and E shown in FIGS. 9 and 10 represent continuity of the processes, but not specific processes.

In response to the state change notification, the DMR 4 and the DMC 5 can perform a simple seamless reproduction. Here, the simple seamless reproduction is a process in which the next musical content is automatically reproduced without the user designating the next music. As described above, after the x-th musical content is reproduced, the (x+1)th musical content which is the musical content on the next track is reproduced.

In Step S87, the DMR 5 which has received the state change notification transmits the reproduction request for the (x+1)th musical content to the DMR 4. The DMR 4 receives the reproduction request which has been transmitted from the DMR 5, and transmits the received reproduction request to the device 2. The reproduction request which has been transmitted from the DMR 4 is received by the DMS 2a of the device 2. The DMS 2a supplies the reproduction request for the received musical content to the external device control module 2c. The external device control module 2c supplies the external device 6 with the reproduction request for the musical content which has been supplied from the DMS 2a. Then, the process proceeds to Step S88.

In Step S88, the external device 6 reproduces the (x+1)th musical content in response to the reproduction request which has been supplied from the external device control module 2c. The reproduced musical content is supplied from the external device 6 to the external device control module 2c.

The external device control module 2c supplies the DMS 2a with the musical content which has been supplied from the external device 6. The musical content is transmitted from the DMS 2a to the DMR 4. The DMR 4 receives the musical content which has been transmitted from the DMS 2a, and performs the reproduction process on the received musical content. Then, the (x+1)th musical content is reproduced by the DMR 4. Further, the musical content which has been reproduced by the external device 6 is supplied by streaming from the point of view of copyright protection.

As described using FIG. 9, the DMR 5 can recognize that the reproduction of the x-th musical content is completed by receiving the state change notification. In addition, in Step S87, the DMC 5 can recognize the musical content which has been requested for reproduction as the (x+1)th musical content. Therefore, for example, the DMC 5 can reproduce the attribute information of the (x+1)th musical content in the process of Step S87, and display the reproduced attribute information such as a title of the (x+1)th musical content in the display of the DMC 5. In this way, once the next musical content is reproduced after the reproduction stops, the DMC 5 can display the attribute information corresponding to the next musical content.

The following processes will be simply described since these are the same as those of Steps S78 to S86 described using FIG. 9. In Step S89 to Step S91, the process of acquiring the data of the musical content which is divided and supplied is repeated. In Step S92 to Step S94, the external device control module 2c acquires the reproduction time information of the (x+1)th musical content from the external device 6. Then, in Step S92, the external device control module 2c measures time when the external device control module 2c is supplying the musical content to the DMS 2a.

In Step S95, the reproduction of the (x+1)th musical content is completed in the external device 6. The time which is being measured by the external device control module 2c reaches the reproduction time information of the (x+1)th musical content, and by this the external device control module 2c can determine that the reproduction of the (x+1)th musical content is completed. Then, the process proceeds to Step S96. In Step S96, if the external device control module 2c determines that the reproduction of the (x+1)th musical content is completed, the external device control module 2c supplies the reproduction stop request to the external device 6. Then, the process proceeds to Step S97.

In Step S97, the external device 6 stops the reproduction process of the musical content in response to the reproduction stop request. Then, the external device 6 supplies the external device control module 2c with the state change notification to inform of that the reproduction of the musical content has stopped. The external device control module 2c supplies the DMS 2a with the state change notification which is supplied from the external device 6. The DMS 2a transmits the state change notification which is supplied from the external device control module 2c to the DMR 4.

The DMR 4 receives the state change notification which is transmitted from the DMS 2a, stops the reproduction request for the musical content. The DMR 4 transmits the received state change notification to the DMC 5. The DMR 4 and the DMC 5 which have received the state change notification can recognize that the reproduction of the (x+1)th musical content is completed. Then, the process proceeds to Step S98, and a series of processes is completed. Further, as the simple seamless reproduction, the reproduction of the (x+2)th musical content which is the next musical content may be reproduced.

Modified Example

Hereinbefore, a plurality of embodiments has been specifically described, and it is a matter of course that various modifications are possible. In the following, a modified example will be described.

Figure 11:
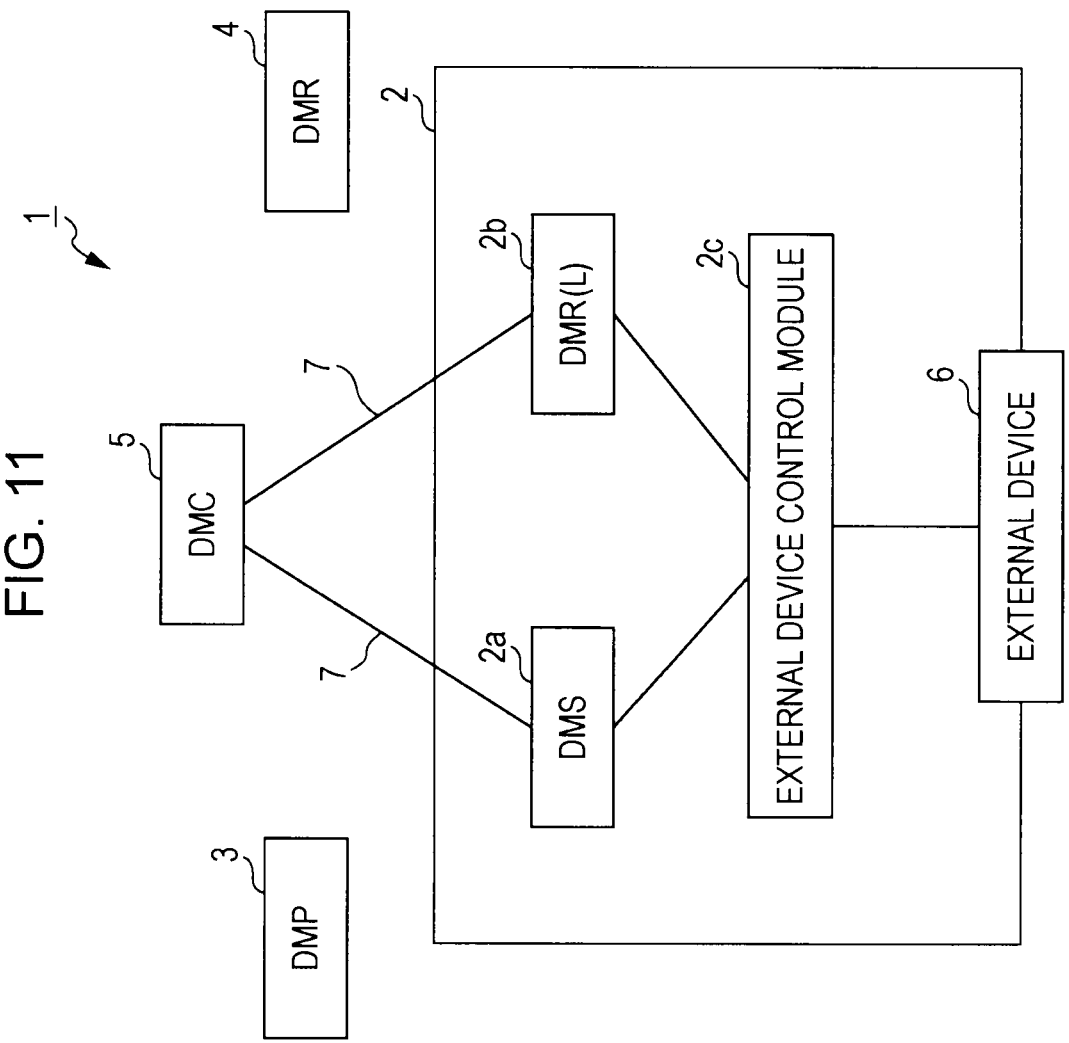
FIG. 11 is a diagram schematically illustrating an outline of operations according to a modified example.

For example, as shown in FIG. 11, the DMR(L) 2b which is included in the device 2 may be used as the reproduction device. In other words, the musical content which is reproduced by the external device 6 is supplied to the external device control module 2c. The external device control module 2c supplies the DMR(L) 2b with the musical content which has been supplied from the external device 6. The musical content which has been supplied from the external device control module 2c may be reproduced by the DMR(L) 2b. In this case, the external device control module 2c supplies the DMR(L) 2b with the state change notification which is supplied from the external device 6. By making the DMR(L) 2b provided with a network connection function, the state change notification may be transmitted from the DMR(L) 2b to the DMC 5.

In the process of Step S31 or Step S81 according to the above-mentioned embodiment, the external device control module 2c may supply the reproduction stop request to the external device 6 before the point of time when the measured time reaches the reproduction time information of the musical content. For example, in the process of Step S55 of FIG. 8, the reproduction time information (for example, 5 minutes) of the x-th musical content is acquired by the external device control module 2c. The external device control module 2c measures time from the point of time when the external device control module 2c begins to supply the musical content to the DMS 2a. When the measured time reaches, for example, several seconds before 5 minutes (for example, 4 minutes and 57 seconds), the external device control module 2c may supply the reproduction stop request to the external device 6. By this, due to transmission delay or reproduction stop process delay of the reproduction stop request, the (x+1)th musical content can be prevented from being reproduced by the external device 6.

In the above-mentioned embodiment, in the processes of Step S52, Step S53, and Step S82, when the reproduction time is measured, the reproduction time information of the musical content has been described to be acquired from the external device 6, but it may not perform the process of acquiring the reproduction time information. For example, the external device control module 2c may be configured to include memory. Then, in the process of Step S23 or Step S73, the attribute information which is supplied from the external device 6 is stored in the memory of the external device control module 2c. The external device control module 2c may be configured to use the reproduction time information in the attribute information stored.

In the above-mentioned embodiment, it has been described that the completion of the reproduction of the musical content is determined using the reproduction time information as the attribute information, but it may be determined to use another attribute information. For example, the title of the musical content is periodically acquired from the external device 6, and when the title of the musical content is changed, it may be determined that the reproduction of the musical content is completed and it is switched to the next musical content. In addition, it may be configured such that the reproduction of the musical content is completed using a plurality of pieces of the attribute information.

It may be configured such that the reproduction of the musical content is completed using a no sound period between the musical content and the musical content on the next track. For example, the musical content which is requested for reproduction is reproduced by the external device 6, and the reproduced musical content is supplied to the external device control module 2c. Thereafter, when a period during which the musical content is not supplied from the external device 6 continues for a predetermined period of time, the external device control module 2c may determine that the reproduction of the musical content is completed.

In the above-mentioned embodiment, when the DMP 3 or the DMC 5 receives the state change notification, the DMP 3 or the DMC 5 may perform a process in which the attribute information which is displayed in the display is removed or in which information that the reproduction of the musical content is completed is displayed.

In the above-mentioned embodiment, the configuration has been described such that one musical content is divided and supplied, but it may not be divided. Even in this case, since the DMP 3 and the like may not be able to recognize that the reproduction of the musical content is completed, the next musical content which is reproduced in the external device 6 is received and reproduced. In this application, the external device control module 2c performs a control of stopping the reproduction process which is executed by the external device 6. Therefore, the DMP 3 and the like do not receive and reproduce the next musical content.

In the above-mentioned embodiment, the musical content has been described as an example of content, but it may be a movie content. In addition, except the function of reproducing content, the external device 6 may be configured to include a telephone function or a network connection function.

The musical content list according to the above-mentioned embodiment may not be the list of all of the musical content which is stored in the external device 6. For example, a so-called play list may be used which is the musical content specified by the user is selected among a plurality of the musical content items which are stored in the external device 6.

The processes according to the above-mentioned embodiments and the modified example may be realized as methods, programs, and a medium which stores the programs.

The present disclosure contains subject matter related to that disclosed in Japanese Priority Patent Application JP 2010-204527 filed in the Japan Patent Office on Sep. 13, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A signal processing apparatus comprising:
a network interface configured to connect to a network;
a connector configured to detachably mount an external device to the connector, the external device reproducing a plurality of content items and attribute information of each of the plurality of content items; and control circuitry configured to
  control the external device mounted on the connector,
  acquire the attribute information from the external device, the attribute information including a title of each content item of the plurality of content items,
  receive a reproduction request for a content item of the plurality of content items from a reproduction device via the network interface over the network,
  supply the reproduction request to the external device,
  receive the content item from the external device, the content item reproduced by the external device in response to the reproduction request,
  supply the content item to the reproduction device by streaming via the network interface over the network,
  determine that reproduction of the content item is completed when a title of a current content item has changed, and
  when the reproduction of the content item is completed, control the external device to stop the reproduction of the content item and notify the reproduction device via the network interface over the network that the reproduction of the content item is completed.

2. The signal processing apparatus according to claim 1, wherein the control circuitry is further configured to determine that the reproduction of the content is completed before a reproduction time of the content item has elapsed.

3. The signal processing apparatus according to claim 1, wherein
  the reproduction request is a request that designates the content item for reproduction, and
  when the control circuitry supplies the reproduction request the external device, the external device is configured to reproduce another content item after the designated content item is completely reproduced.

4. The signal processing apparatus according to claim 1, wherein the acquired attribute information is displayed by the reproduction device or another device.

5. A signal processing method comprising:
  connecting an external device to a connector, the connector configured to detachably mount the external device to the connector, the external device reproducing a plurality of content items and attribute information of each of the plurality of content items;
  controlling the external device mounted on the connector;
  acquiring the attribute information from the external device, the attribute information including a title of each content item of the plurality of content items;
  receiving a reproduction request for a content item of the plurality of content items from a reproduction device via a network connection;
  supplying a reproduction request to the external device;
  receiving the content item from the external device, the content item reproduced by the external device in response to the reproduction request;
  supplying the content item to the reproduction device by streaming via the network connection;
  determining that reproduction of the content item is completed when a title of a current content item has changed; and
  when the reproduction of the content item is completed, controlling the external device to stop the reproduction of the content item and notifying the reproduction device via the network connection that the reproduction of the content item is completed.

6. The signal processing method according to claim 5, further comprising determining whether the reproduction of the content is completed before a reproduction time of the content item has elapsed.

7. The signal processing method according to claim 5, wherein
  the reproduction request is a request that designates the content item for reproduction, and
  when the reproduction request is supplied to the external device, the external device is configured to reproduce another content item after the designated content item is completely reproduced.

8. The signal processing method according to claim 5, wherein the acquired attribute information is displayed by the reproduction device or another device.

9. The signal processing apparatus according to claim 1, wherein the control circuitry is further configured to supply the attribute information including the title of each content item of the plurality of content items to the reproduction device via the network.

10. The signal processing apparatus according to claim 1, wherein the attribute information further includes an item order for listing the plurality of content items.

11. The signal processing apparatus according to claim 1, wherein the control circuitry is further configured to notify the reproduction device by transmitting a notification that the reproduction of the content item is completed.

12. The signal processing apparatus according to claim 3, wherein the control circuitry is further configured to introduce a no sound period after the reproduction of the content item is completed and before reproduction of the another content item.

13. The signal processing apparatus according to claim 1, wherein the control circuitry is further configured to determine that the reproduction of the content is completed when a reproduction time for the content item included in the acquired attribute information has elapsed.

14. The signal processing method according to claim 5, further comprising:
  supplying the attribute information including the title of each content item of the plurality of content items to the reproduction device via the network.

15. The signal processing method according to claim 5, wherein the attribute information further includes an item order for listing the plurality of content items.

16. The signal processing method according to claim 5, wherein the notifying the reproduction device via the network includes transmitting a notification, via the network, to the reproduction device, the notification indicating that the reproduction of the content item is completed.

17. The signal processing method according to claim 7, further comprising:
  introducing a no sound period after the reproduction of the content item is completed that terminates before reproduction of the another content item.

18. A signal processing apparatus comprising:
  a connector; and
  control circuitry configured to
    control an external device that reproduces a plurality of content items and attribute information of each of the plurality of content items, the external device mounted on the connector;
    acquire the attribute information from the external device, the attribute information including a title of each content item of the plurality of content items;

receive a reproduction request for a content item of the plurality of content items from a reproduction device via a network;

supply the reproduction request to the external device;

receive the content item from the external device;

supply the content item to the reproduction device by streaming the content item over the network;

determine that reproduction of the content item is completed when a title of a current content item has changed; and when the reproduction of the content item is completed, control the external device to stop the reproduction of the content item and notify the reproduction device via the network that the reproduction of the content item is completed.

19. The signal processing apparatus according to claim 18, wherein the control circuitry is further configured to determine that the reproduction of the content is completed before a reproduction time of the content item has elapsed.

20. The signal processing apparatus according to claim 18, wherein the reproduction request is a request that designates the content item, and when the control circuitry supplies the reproduction request the external device, the external device is configured to reproduce another content item after the designated content item is completely reproduced.

* * * * *